United States Patent
Wang

(10) Patent No.: US 12,465,920 B2
(45) Date of Patent: Nov. 11, 2025

(54) THERMAL CYCLING DEVICE, AND DETECTION DEVICE THEREWITH

(71) Applicant: Wistron Corporation, New Taipei (TW)

(72) Inventor: Chen-Fa Wang, New Taipei (TW)

(73) Assignee: Wistron Corporation, New Taipei (TW)

( * ) Notice: Subject to any disclaimer, the term of this patent is extended or adjusted under 35 U.S.C. 154(b) by 1028 days.

(21) Appl. No.: 17/499,854

(22) Filed: Oct. 12, 2021

(65) Prior Publication Data

US 2022/0355301 A1 Nov. 10, 2022

(30) Foreign Application Priority Data

May 4, 2021 (TW) ................... 110116039

(51) Int. Cl.
*B01L 7/00* (2006.01)
*G01N 1/42* (2006.01)
*G01N 1/44* (2006.01)

(52) U.S. Cl.
CPC ............... *B01L 7/52* (2013.01); *G01N 1/42* (2013.01); *G01N 1/44* (2013.01); *B01L 2300/0627* (2013.01); *B01L 2300/1805* (2013.01)

(58) Field of Classification Search
CPC ....... B01L 2300/185; B01L 2300/1822; B01L 2300/1861
See application file for complete search history.

(56) References Cited

U.S. PATENT DOCUMENTS

| | | |
|---|---|---|
| 8,900,853 B2 | 12/2014 | Verhaar |
| 2008/0092553 A1* | 4/2008 | Hochgraeber ...... F04D 29/5826 62/3.6 |
| 2010/0087325 A1 | 4/2010 | Buermann |
| 2019/0308194 A1 | 10/2019 | Watanabe |

* cited by examiner

Primary Examiner — Natalia Levkovich
(74) Attorney, Agent, or Firm — Winston Hsu

(57) ABSTRACT

A thermal cycling device includes a thermally-conductive carrier, a temperature adjustment device, a storage tank, and a liquid delivery device. The temperature adjustment device is thermally coupled with the thermally-conductive carrier. The storage tank is disposed corresponding to and abuts against the temperature adjustment device, or the temperature adjustment device is at least partially disposed in the storage tank. The liquid delivery device communicates with the storage tank.

14 Claims, 5 Drawing Sheets

THERMAL CYCLING DEVICE, AND DETECTION DEVICE THEREWITH

BACKGROUND OF THE INVENTION

1. Field of the Invention

The present invention relates to a thermal cycling device, and more particularly to a thermal cycling device capable of performing Polymerase Chain Reaction (PCR) on biological samples.

2. Description of the Prior Art

One of the methods commonly used in genetic testing is the polymerase chain reaction. Most PCR methods rely on thermal cycles, of which each has in principle several different temperature stages, so the speed of temperature adjustment will affect the time required for the cycle. In general, genetic testing instrument achieves the purpose of controlling the temperature of the sample by heating and heat-dissipating the sample carrier. Heating (or raising temperature) is usually achieved by heating with an electric heater. Heat dissipation (or cooling, temperature reduction) can be achieved by directly dissipating heat from the sample carrier through fans, heat-dissipating fins or heat pipes. However, the heat-dissipating fins and heat pipes are fixed configurations; that is, the heat-dissipating fins and heat pipes are always fixed on the sample carrier. Therefore, regardless of whether the electric heater heats the sample holder or not, the heat-dissipating fins and heat pipes will dissipate heat from the sample carrier, so that the electric heater consumes more energy to heat the sample carrier. Furthermore, the heat capacities of the heat-dissipating fins and the heat pipes will also affect the heating and heat dissipation rates of the sample carrier. In addition, fans use airflow as a heat dissipation medium, but the air density is so small that the heat dissipation effect is limited and thus the heat dissipation rate is not easy to increase. Therefore, lower heating and heat dissipation rates will make the transition efficiency of the temperature stages worse, and will also extend the time required for the cycle.

SUMMARY OF THE INVENTION

An objective of the invention is to provide a thermal cycling device, which uses movable cooling liquid/heat dissipation liquid to improve heat dissipation efficiency and/or heating efficiency.

A thermal cycling device of an embodiment according to the invention includes a thermally-conductive carrier, a temperature adjustment device, a first storage tank, and a liquid delivery device. The temperature adjustment device is thermally coupled with the thermally-conductive carrier to adjust a temperature of the thermally-conductive carrier. The temperature adjustment device abuts against the first storage tank or is at least partially disposed in the first storage tank. The liquid delivery device communicates with the first storage tank. Thereby, in practice, the liquid delivery device can deliver a liquid into the storage tank for cooling to facilitate heat dissipation of the thermally-conductive carrier, or can deliver the liquid from the storage tank to conducive to the heating of the thermally-conductive carrier; both help to improve the heat dissipation efficiency and/or heating efficiency of the thermally-conductive carrier.

In an embodiment according to the invention, the temperature adjustment device has a heat exchange surface. The heat exchange surface abuts against the first storage tank or is at least partially disposed in the first storage tank.

In an embodiment according to the invention, the thermal cycling device further includes a liquid, stored in the first storage tank.

In an embodiment according to the invention, the thermal cycling device further includes a second storage tank and a delivery piping. The second storage tank communicates with the liquid delivery device. The delivery piping communicates with the first storage tank and the second storage tank.

In an embodiment according to the invention, a capacity of the second storage tank is greater than a capacity of the first storage tank.

In an embodiment according to the invention, the liquid delivery device includes a pump. The pump communicates with the first storage tank and the second storage tank.

In an embodiment according to the invention, the delivery piping includes a first sub-piping and a second sub-piping, each communicating with the first storage tank and the second storage tank respectively. The pump is disposed in the first sub-piping. The first storage tank has a first communicating hole and a second communicating hole. The position of the second communicating hole is higher than that of the first communicating hole. The first sub-piping and the second sub-piping communicate with the first storage tank through the first communicating hole and the second communicating hole respectively.

In an embodiment according to the invention, the thermal cycling device further includes a liquid, stored in the first storage tank or the second storage tank. Therein, the delivery piping includes a first sub-piping and a second sub-piping, of which each communicates with the first storage tank and the second storage tank. The pump is disposed in the first sub-piping. The liquid delivery device uses the pump to deliver the liquid, selectively from the second storage tank to the first storage tank through the first sub-piping, or from the first storage tank to the second storage tank through the first sub-piping.

In an embodiment according to the invention, a capacity of the second storage tank is greater than a capacity of a portion of the first storage tank that is below the position of the second communicating hole.

In an embodiment according to the invention, the temperature adjustment device has a heat exchange surface. The heat exchange surface abuts against the first storage tank or is at least partially disposed in the first storage tank. The first storage tank has a first communicating hole and a second communicating hole. The position of the second communicating hole is higher than the heat exchange surface. The first sub-piping and the second sub-piping communicate with the first storage tank through the first communicating hole and the second communicating hole respectively.

In an embodiment according to the invention, the thermal cycling device further includes a heat-dissipating device, thermally coupled with the second storage tank to dissipate heat from the second storage tank.

In an embodiment according to the invention, the thermal cycling device further includes a temperature sensor, configured to sense a temperature of or inside the second storage tank. Therein, the heat-dissipating device operates in response to the temperature level.

In an embodiment according to the invention, the temperature adjustment device includes one or both of a thermoelectric component and an electric heater.

Another objective of the invention is to provide a detection device, which includes a thermal cycling device like those mentioned above and therefore has better heat dissipation efficiency and/or heating efficiency.

In an embodiment according to the invention, the detection device includes a reaction detector and a thermal cycling device like those mentioned above. The reaction detector is disposed adjacent to the thermally-conductive carrier. In practice, the reaction detector can be used to detect the reaction container (or contents thereof) carried on the thermally-conductive carrier. Similarly, the detection device can have better heat dissipation efficiency and/or heating efficiency for the thermally-conductive carrier through the thermal cycling device.

In an embodiment according to the invention, the detection device further includes a rotating device, configured to rotate the thermally-conductive carrier.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
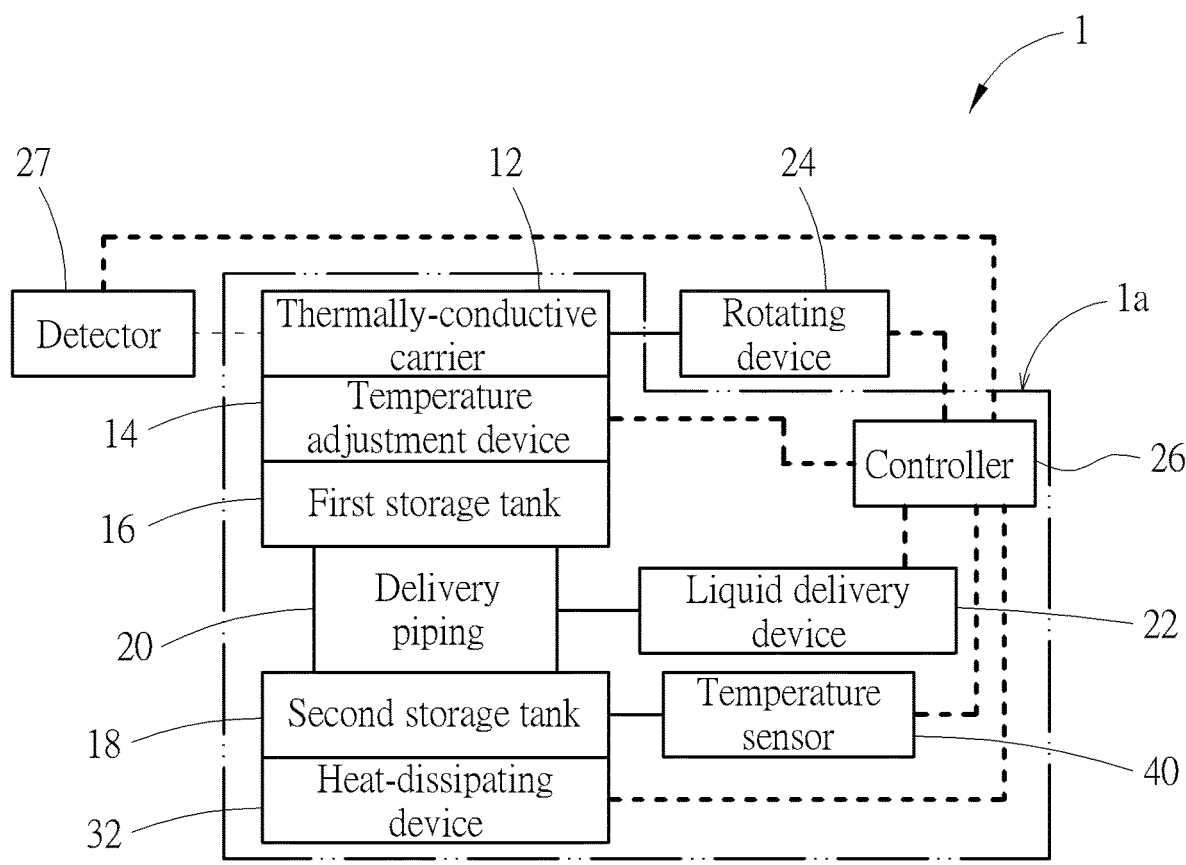
FIG. 1 is a functional block diagram of a detection device of an embodiment according to the invention.
Figure 2:
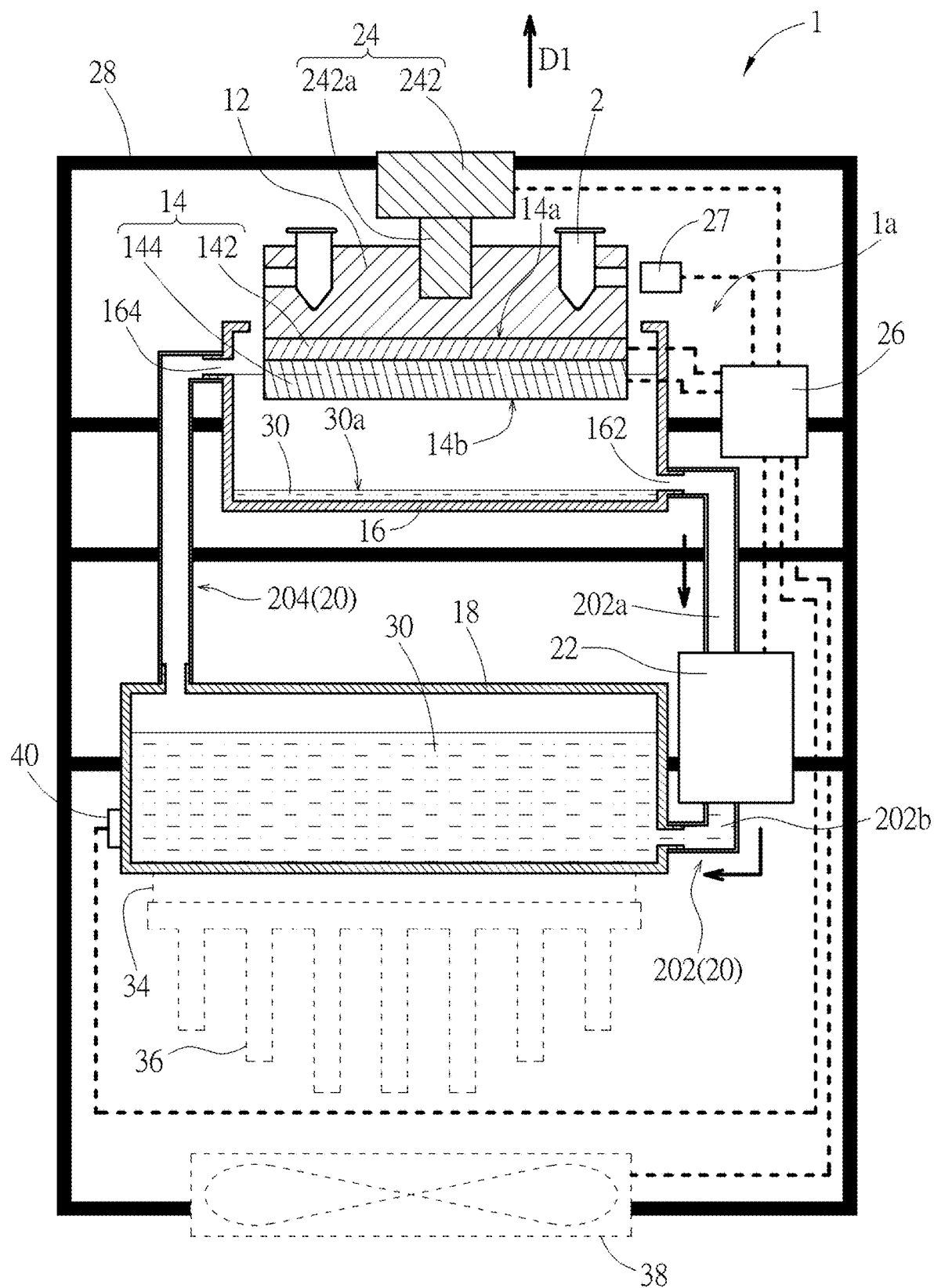
FIG. 2 is a schematic diagram illustrating the detection device in FIG. 1 in a first use state.
Figure 3:
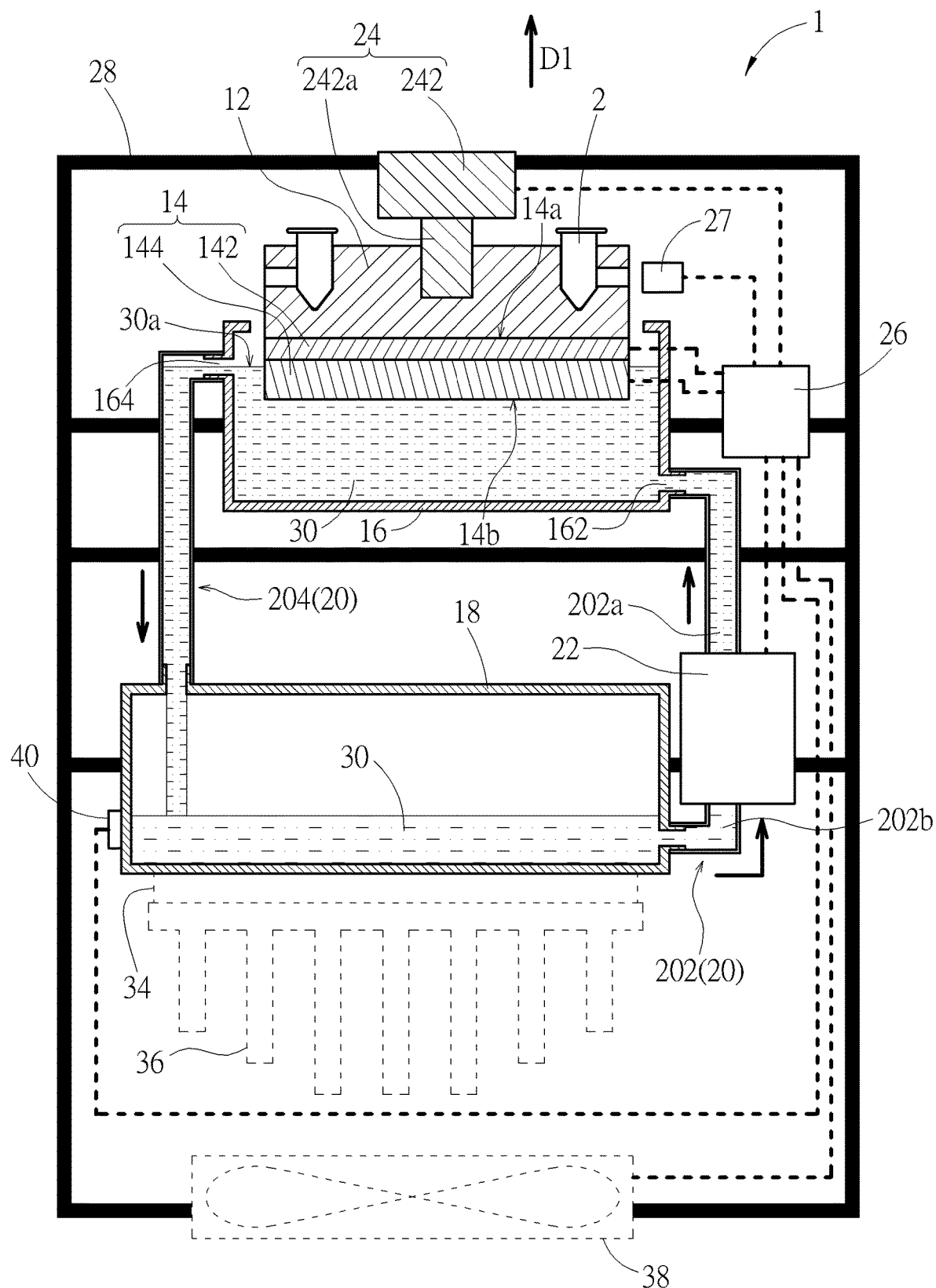
FIG. 3 is a schematic diagram illustrating the detection device in FIG. 1 in a second use state.

Please refer to FIG. 1 to FIG. 3. A detection device 1 of an embodiment according to the invention includes a thermally-conductive carrier 12, a temperature adjustment device 14, a first storage tank 16, a second storage tank 18, a delivery piping 20 (shown by a rectangle in FIG. 1), a liquid delivery device 22 (shown by a rectangle in FIG. 2 and FIG. 3), a rotating device 24, a controller 26, a reaction detector 27, and an apparatus supporting frame 28 (shown in bold lines in FIG. 2 and FIG. 3 for simplification of drawing) for supporting the above components. The temperature adjustment device 14 is thermally coupled with the thermally-conductive carrier 12. The first storage tank 16 is disposed to abut against the temperature adjustment device 14. In an instance according to the invention, the temperature adjustment device 14 has a first heat exchange surface 14a. The temperature adjustment device 14 is thermally coupled with the thermally-conductive carrier 12 through the first heat exchange surface 14a, e.g. by, but not limited to, directly touching and filling with a thermally conductive material therebetween. In an instance according to the invention, the temperature adjustment device 14 has a second heat exchange surface 14b, disposed corresponding to the first storage tank 16. In an instance according to the invention, the first storage tank 16 is disposed to abut against the second heat exchange surface 14b; in another instance according to the invention, the second heat exchange surface 14b is disposed in the first storage tank 16; in another instance according to the invention, the second heat exchange surface 14b may cover the first storage tank 16. In an instance according to the invention, the first storage tank 16 and temperature adjustment device 14 may be liquid-tight therebetween. In an instance according to the invention, the first storage tank 16 and temperature adjustment device 14 may be airtight therebetween.

As shown by FIG. 1 to FIG. 3, the delivery piping 20 communicates with the first storage tank 16 and the second storage tank 18. The liquid delivery device 22 is installed in the delivery piping 20. The rotating device 24 is connected to the thermally-conductive carrier 12. The reaction detector 27 is disposed adjacent to the thermally-conductive carrier 12. The controller 26 is electrically connected (indicated by dashed lines in the figures) to the temperature adjustment device 14, the liquid delivery device 22, the rotating device 24 and the reaction detector 27, for controlling the operation thereof. In the structural configuration of the embodiment, the collection of the thermally-conductive carrier 12, the temperature adjustment device 14, the first storage tank 16, the second storage tank 18, the delivery piping 20, the liquid delivery device 22, the controller 26, and the apparatus supporting frame 28 can be regarded as a thermal cycling device 1a (indicated by chain lines in FIG. 1). In an instance according to the invention, the liquid delivery device 22 and the first storage tank 16 are connected with each other; therein, the liquid delivery device 22 and the first storage tank 16 may be directly connected, or indirectly connected by the delivery piping 20.

Therein, the second storage tank 18 is used for storing a liquid 30 (e.g. but not limited to water or other cooling liquids). The controller 26 can control the liquid delivery device 22 to deliver the liquid 30 through the delivery piping 20 between the second storage tank 18 and the first storage tank 16. For example, as shown FIG. 2, the liquid delivery device 22 delivers the liquid 30 in the first storage tank 16 to the second storage tank 18 (in which the flowing direction of the liquid 30 is indicated by arrows in FIG. 2). As another example, as shown by FIG. 3, the liquid delivery device 22 delivers the liquid 30 in the second storage tank 18 to the first storage tank 16 (in which the flowing direction of the liquid 30 is indicated by arrows in FIG. 3). Furthermore, the controller 26 can also control the temperature adjustment device 14 to heat the thermally-conductive carrier 12 and control the rotating device 24 to rotate the thermally-conductive carrier 12. In an instance according to the invention, the liquid delivery device 22 and the second storage tank 18 are connected with each other; therein, the liquid delivery device 22 and the second storage tank 18 may be directly connected, or indirectly connected by the delivery piping 20.

Thereby, a temperature control method for the detection device 1 (or the thermal cycling device 1a) uses the liquid delivery device 22 to control whether the liquid 30 dissipates heat from the thermally-conductive carrier 12 (through the temperature adjustment device 14 and/or the second heat exchange surface 14b), so as to produce rapid heating and heat dissipation effects on the thermally-conductive carrier 12. Further, the temperature control method includes using the controller 26 to control the temperature adjustment device 14 to stop heating, and to control the liquid delivery device 22 to make the liquid 30 enter the first storage tank 16 through the delivery piping 20 and touch the temperature adjustment device 14 and/or the second heat exchange surface 14b, so that the temperature of the thermally-conductive carrier 12 decreases; and using the controller 26 to control the temperature adjustment device 14 to heat, and to control the liquid delivery device 22 to make the liquid 30 in the first storage tank 16 separate from the temperature adjustment device 14 and/or the second heat exchange surface 14b, so that the temperature of the thermally-conductive carrier 12 increases. Furthermore, in the embodiment, the first storage tank 16, the second storage tank 18, and the delivery piping 20 form a circulation path of the liquid 30, so the temperature control method also includes using the controller 26 to control the liquid delivery device 22 to deliver the liquid 30 between the first storage tank 16 and the second storage tank 18 through the delivery piping 20; this step can be implemented in conjunction with the aforementioned step of controlling whether the liquid 30 touches the second heat exchange surface 14b.

For example, in practice, when the thermally-conductive carrier 12 needs to be heated up, the controller 26 controls the temperature adjustment device 14 to heat the thermally-conductive carrier 12. If the liquid 30 in the first storage tank 16 touches the second heat exchange surface 14b of the temperature adjustment device 14 at this time (e.g. the liquid 30 in the first storage tank 16 in FIG. 3), the controller 26 can control the liquid delivery device 22 to deliver the liquid 30 in the first storage tank 16 to the second storage tank 18 to lower the liquid level, so that the liquid 30 can separate from the temperature adjustment device 14 and/or the second heat exchange surface 14b (e.g. the liquid level 30a of the liquid 30 is lower than the second heat exchange surface 14b, as shown in FIG. 2) for increasing the temperature rise rate of the thermally-conductive carrier 12. When the thermally-conductive carrier 12 needs to cool down, the controller 26 controls the temperature adjustment device 14 to stop heating the thermally-conductive carrier 12. The controller 26 can further control the liquid delivery device 22 to make the liquid 30 enter the first storage tank 16 from the second storage tank 18 through the delivery piping 20 and touch the second heat exchange surface 14b (as shown in FIG. 3) for increasing the temperature drop rate of the thermally-conductive carrier 12. In an instance according to the invention, when the liquid 30 enters the first storage tank 16 from the second storage tank 18 through the delivery piping 20, the liquid level of the liquid 30 in the first storage tank 16 will rise and then touch the second heat exchange surface 14b. In another instance according to the invention, when the liquid 30 enters the first storage tank 16 from the second storage tank 18 through the delivery piping 20, the liquid 30 may be directly sprayed onto the second heat exchange surface 14b to touch it. In an instance according to the invention, when the liquid 30 enters the first storage tank 16 from the second storage tank 18 through the delivery piping 20, the total amount (mass and/or volume) of the liquid 30 in the first storage tank 16 will increase, and then the liquid 30 will touch the temperature adjustment device 14 and/or second heat exchange surface 14b. In another instance according to the invention, when the liquid 30 enters the first storage tank 16 from the second storage tank 18 through the delivery piping 20, the liquid 30 may be directly sprayed onto the temperature adjustment device 14 and/or the second heat exchange surface 14b to touch it. Therefore, the liquid 30 controlled by the liquid delivery device 22 will not increase the burden of the temperature adjustment device 14 on heating the thermally-conductive carrier 12. In principle, all the heat generated by the temperature adjusting device 14 can be used to heat the heat conducting carrier 12, and the temperature adjustment device 14 can also heat the thermally-conductive carrier 12 at a faster rate. In addition, since the heat capacity of the liquid 30 is greater than that of air, the heat dissipation effect of the liquid 30 is better than that of air. Besides, the heat transfer efficiency of the liquid 30 is greater than that of air, so when the thermally-conductive carrier 12 needs to dissipate heat, the liquid 30 can provide a higher heat transfer efficiency. In an instance according to the invention, temperature adjustment device 14 is at least partially disposed in the first storage tank 16 to facilitate heat dissipation. In an instance according to the invention, the second heat exchange surface 14b is at least partially disposed in the first storage tank 16 to facilitate heat dissipation.

In the embodiment, the delivery piping 20 includes a first sub-piping 202 and a second sub-piping 204, of which each communicates with the first storage tank 16 and the second storage tank 18. In practice, the liquid delivery device 22 may include a pump, disposed in the first sub-piping 202. The pump communicates with the first storage tank and the second storage tank. Therein, a first portion 202a of the first sub-piping 202 is connected to and between the liquid delivery device 22 and the first storage tank 16. A second portion 202b of the first sub-piping 202 is connected to and between the liquid delivery device 22 and the second storage tank 18. In practice, in coordination with the mechanism of the pump, the liquid delivery device 22 can include a bypass line and a controllable valve disposed on the bypass line, so that the liquid delivery device 22 can use this pump to selectively deliver the liquid 30 from the second storage tank 18 to the first storage tank 16 through the first sub-piping 202, or from the first storage tank 16 to the second storage tank 18 through the first sub-piping 202.

Furthermore, the first storage tank 16 has a first communicating hole 162 and a second communicating hole 164. The position of the second communicating hole 164 is provided higher than that of the first communicating hole 162 in a direction D1 (indicated by an arrow in the figures) opposite to gravity. The first sub-piping 202 and the second sub-piping 204 communicate with the first storage tank 16 through the first communicating hole 162 and the second communicating hole 164 respectively. The first communicating hole 162 is provided at a position lower than the second heat exchange surface 14b (of the temperature adjustment device 14) in the direction D1. This configuration helps to use gravity to return the liquid 30 in the first storage tank 16 to the second storage tank 18 through the first communicating hole 162 and the first sub-piping 202. For example, the liquid delivery device 22 stops the pump, and the bypass line is opened (through a controllable valve), so that the liquid 30 is allowed to flow back to the second storage tank 18 through the bypass line by gravity.

In the embodiment, the second sub-piping 204 can be used as an overflow pipe. The liquid 30 in the first storage tank 16 can flow back to the second storage tank 18 through the second sub-piping 204 and then can be delivered to the first storage tank 16 through the first sub-piping 202 by the liquid delivery device 22 again. The second communicating hole 164 is located at a position higher than that of the second heat exchange surface 14b in the direction D1, so that the liquid level 30a of the liquid 30 in the first storage tank 16 is higher than the second heat exchange surface 14b, so as to ensure that the liquid 30 in the first storage tank 16 will touch the second heat exchange surface 14b before leaving the first storage tank 16 from the second communicating hole 164. Furthermore, the second sub-piping 204 also helps the liquid 30 in the first storage tank 16 to keep flowing (i.e. entering from the first communicating hole 162, and leaving from the second communicating hole 164) when using the liquid 30 to dissipate heat from the temperature adjustment device 14 (through the second heat exchange surface 14b), which increases the heat exchange efficiency and thereby increases the temperature drop rate of the thermally-conductive carrier 12. In addition, in practice, the positions of the first communicating hole 162 and the second communicating hole 164 are not limited to this embodiment. For example, even if the position of the first communicating hole 162 is higher than or equal to the second communicating hole 164 or the second heat exchange surface 14b, by controlling the delivery conditions of the liquid 30 (e.g. the pressure, velocity and so on in the first sub-piping 202), the liquid 30 in the first storage tank 16 still can touch the second heat exchange surface 14b when the thermally-conductive carrier 12 needs to cool down, and can separate from the second heat exchange surface 14b when the thermally-conductive carrier 12 needs to heat up.

In addition, in the embodiment, the liquid delivery device 22 uses pump, gravity, etc., with the configuration of delivery piping 20 to deliver the liquid 30 between the first storage tank 16 and the second storage tank 18 through the delivery piping 20, so that the liquid 30 can exchange heat with the temperature adjustment device 14 (to increase the heat dissipation efficiency of the thermally-conductive carrier 12), and can avoid touching the second heat exchange surface 14b (to avoid affecting the heating efficiency of the temperature adjustment device 14 to the thermally-conductive carrier 12). However, it is not limited thereto in practice. For example, the liquid delivery device 22 may be achieved by a controllable valve instead. The first sub-piping 202 is connected to a liquid source (such as a water tower) outside the detection device 1 (or the thermal cycling device 1a). The second sub-piping 204 is used for discharging the liquid 30 in the first storage tank 16. The controllable valve can be used to control whether the external liquid enters the first storage tank 16 through the first sub-piping 202 or not. In this case, the second storage tank 18 may be omitted, and the second sub-piping 204 is used for discharging the liquid 30 in the first storage tank 16 from the detection device 1 (or the thermal cycling device 1a). For another example, the liquid delivery device 22 may be achieved by a T-shaped tube with two controllable valves. The first sub-piping 202 is connected to a liquid source (such as a water tower) outside the detection device 1 (or the thermal cycling device 1a). The two controllable valves can be used to control whether the external liquid enters the first storage tank 16 through the first sub-piping 202, and can be controlled to control the liquid 30 in the first storage tank 16 to be discharged from the detection device 1 (or the thermal cycling device 1a) through the first sub-piping 202 and the T-shaped tube. In this case, the second storage tank 18 and the second sub-piping 204 may be omitted.

Furthermore, in the embodiment, in the process of cooling the thermally-conductive carrier 12, the controller 26 controls the temperature adjustment device 14 to stop heating. The liquid 30 is extracted from the second storage tank 18 by the liquid delivery device 22 and enters the first storage tank 16 through the first sub-piping 202. After absorbing the heat energy from the temperature adjustment device 14, the liquid 30 returns to the second storage tank 18 through the second sub-piping 204. Therefore, the circulation of the liquid 30 is formed. The liquid 30 returned to the second storage tank 18 can be heat-dissipated through a heat-dissipating device (which will be described below), so that the liquid 30 can enter the first storage tank 16 again (via the first sub-piping 202) at a lower temperature to dissipate heat from the thermally-conductive carrier 12 (i.e., absorbing heat through the temperature adjustment device 14). In practice, the capacity of the second storage tank 18 can be designed to be equal to or greater than the capacity of the first storage tank 16. For example, the capacity of the second storage tank 18 is one, two, five, ten, twenty, etc. times the capacity of the first storage tank 16. Or, the capacity of the second storage tank 18 is greater than that of the portion of the first storage tank 16 that is below the position of the second communicating hole 164 (i.e., the portion under the horizontal chain line aligned with the lower edge of the second communicating hole 164 in FIG. 2). Or, the capacity of the second storage tank 18 can be designed to be relatively smaller than that of the first storage tank 16, e.g. 90% or 80%, as long as the liquid 30 returning from the first storage tank 16 to the second storage tank 18 can be effectively cooled to facilitate the absorption of heat from the temperature adjustment device 14 again. In an instance according to the invention, when the liquid 30 enters the second storage tank 18 from the first storage tank 16 through the delivery piping 20, the total amount (quality and/or volume) of the liquid in the first storage tank 16 decreases so that the liquid in the first storage tank 16 separates from the temperature adjustment device 14 and/or the second heat exchange surface 14b.

Furthermore, in practice, the thermal cycling device 1a of the detection device 1 may include a heat-dissipating device 32 (as shown by FIG. 1), thermally coupled with the second storage tank 18 for dissipating heat of the second storage tank 18 so as to cool the liquid 30 in the second storage tank 18, which increases the efficiency of heat exchange (through the second heat exchange surface 14b) between the liquid 30 and the temperature adjustment device 14 after entering the first storage tank 16. The heat-dissipating device 32 may include any one of a heat sink, a fan, a thermoelectric component, and a heat pipe, a combination of any two of them, a combination of the three, or a combination of all of them. For example, the heat-dissipating device 32 includes a thermoelectric component 34 (indicated by a rectangle in dashed lines in the figures) disposed at the bottom of the second storage tank 18, a heat sink 36 (shown in dashed lines in the figures) disposed on the thermoelectric component 34, and a fan 38 (shown in dashed lines in the figures) disposed opposite to the heat sink 36. The controller 26 is electrically connected to the thermoelectric component 34 and the fan 38, and thereby, the temperature control method includes using the controller 26 to control the heat-dissipating device 32 (or the thermoelectric component 34 and the fan 38 thereof) to dissipate heat from the liquid 30 stored in the second storage tank 18. Therein, the controller 26 controls the thermoelectric component 34 to absorb heat from the second storage tank 18 by the thermoelectric effect and conduct the absorbed heat to the heat sink 36. The controller 26 controls the fan 38 to generate an airflow that flows through the heat sink 36 to dissipate heat from the heat sink 36. In practice, the thermoelectric component 34, the heat sink 36, and the fan 38 may be disposed independently, which still can dissipate heat from the second storage tank 18. Heat pipes have a heat transfer effect and are also common heat dissipation components in heat dissipation systems. The heat pipe may be used independently or in coordination with the components of the heat-dissipating device 32. For example, the heat sink 36 may alternatively be provided on the outside the apparatus supporting frame 28. The heat pipe is thermally coupled with the thermoelectric component 34 and the heat sink 36. Other configuration variants will not be described in addition. In addition, because of the disposition of the heat-dissipating device 32, the thermal cycling device 1a of the detection device 1 may further includes a temperature sensor 40 (shown by a rectangle in dashed lines in the figures), configured to sense a temperature of the second storage tank 18 or a temperature of the liquid 30 in the second storage tank 18. The heat-dissipating device 32 operates in response to the temperature level (e.g. starting the fan 38 when the temperature is higher than a predetermined temperature).

Figure 4:
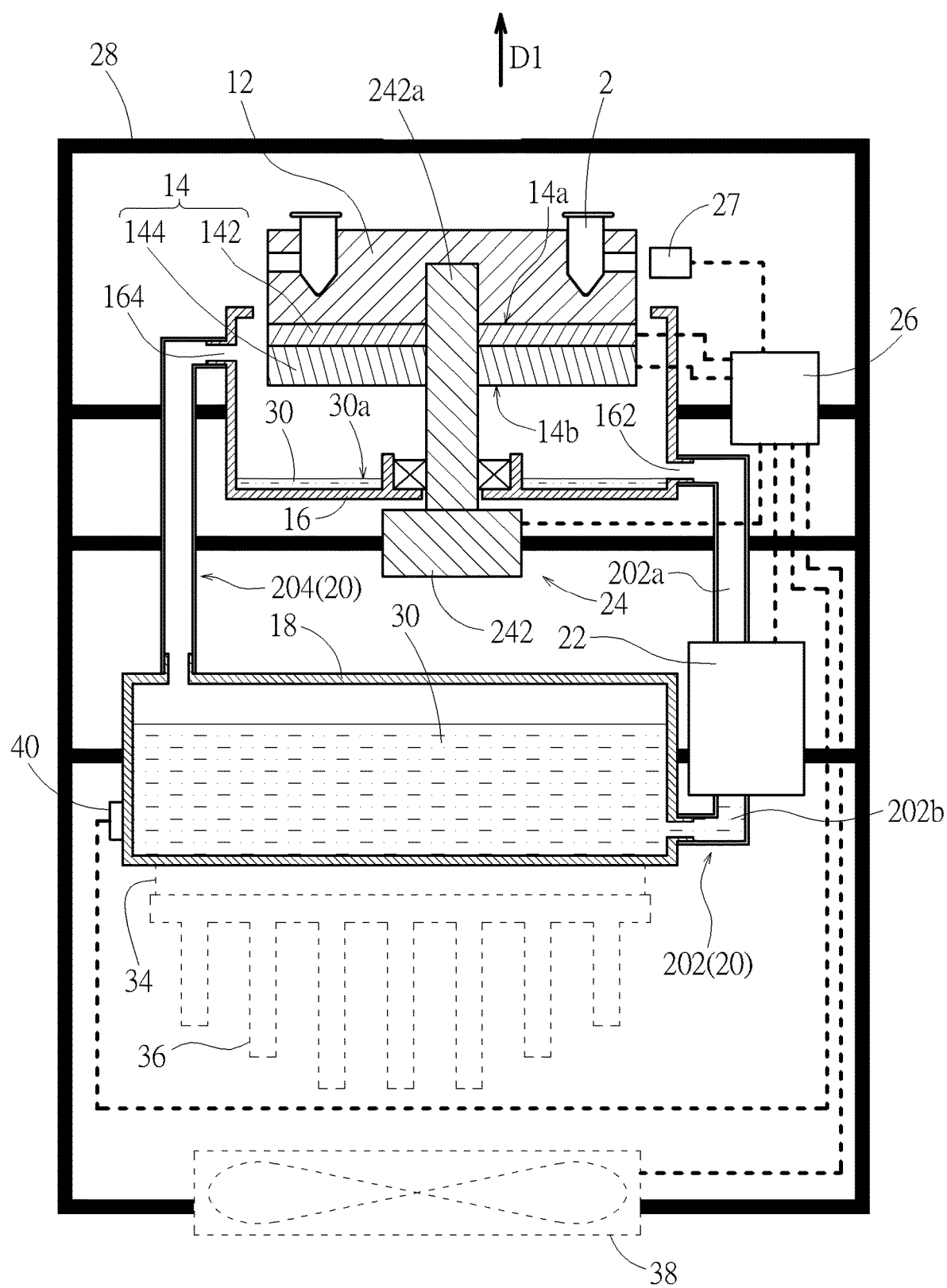
FIG. 4 is a schematic diagram illustrating a detection device of another embodiment according to the invention.

In addition, in the embodiment, the temperature adjustment device 14 includes a thermoelectric component 142 and an electric heater 144. The thermoelectric component 142 is disposed between the electric heater 144 and the thermally-conductive carrier 12. The first heat exchange surface 14a is located on the thermoelectric component 142. The second heat exchange surface 14b is located on the electric heater 144. The thermoelectric element 142 helps to control the temperature of the thermally conductive carrier 12. Furthermore, in the embodiment, the rotating device 24 includes a motor 242. The motor 242 has a shaft 242a. The thermally-conductive carrier 12 is fixedly connected to the temperature adjustment device 14 and is connected to the shaft 242a. The rotating device 24 uses the shaft 242a of the motor 242 to drive the thermally-conductive carrier 12 and the temperature adjustment device 14 to rotate together. In the embodiment, the motor 242 is disposed above the thermally-conductive carrier 12. In practice, the motor 242 may be disposed under the first storage tank 16, the shaft 242a passes through the first storage tank 16 to connect with the thermally-conductive carrier 12 and the temperature adjustment device 14. For example, the first storage tank 16 is modified into a doughnut shape. The shaft 242a passes through the hollow portion of the doughnut. As another example, a sealed bearing (as shown by FIG. 4) or a wear-resistant seal ring is disposed at the bottom of the first storage tank 16 where the shaft 242a passes through, so that the shaft 242a can pass through the bottom of the first storage tank 16 and remain liquid-tight. Furthermore, in practice, the first storage tank 16 can also adopt a sealed structure to achieve a liquid-tight or air-tight effect. For example, the portion of the first storage tank 16 touching the temperature adjustment device 14 uses a wear-resistant sealing ring, so that temperature adjustment device 14 and the first storage tank 16 can stably abut against each other. In an instance according to the invention, the rotation power of the motor 242 can also be indirectly provided to the thermally-conductive carrier 12 through other mechanisms (e.g. a gear mechanism) to make the thermally-conductive carrier 12 rotate. In an instance according to the invention, the temperature adjustment device 14 includes the thermoelectric component 142 but not the electric heater 144. In this instance, the upper surface of the thermoelectric component 142 is used as the first heat exchange surface 14a, and the lower surface thereof is used as the second heat exchange surface 14b. In an instance according to the invention, the temperature adjustment device 14 includes the electric heater 144 but not the thermoelectric component 142. In this instance, the upper surface of the electric heater 144 is used as the first heat exchange surface 14a, and the lower surface thereof is used as the second heat exchange surface 14b.

Figure 5:
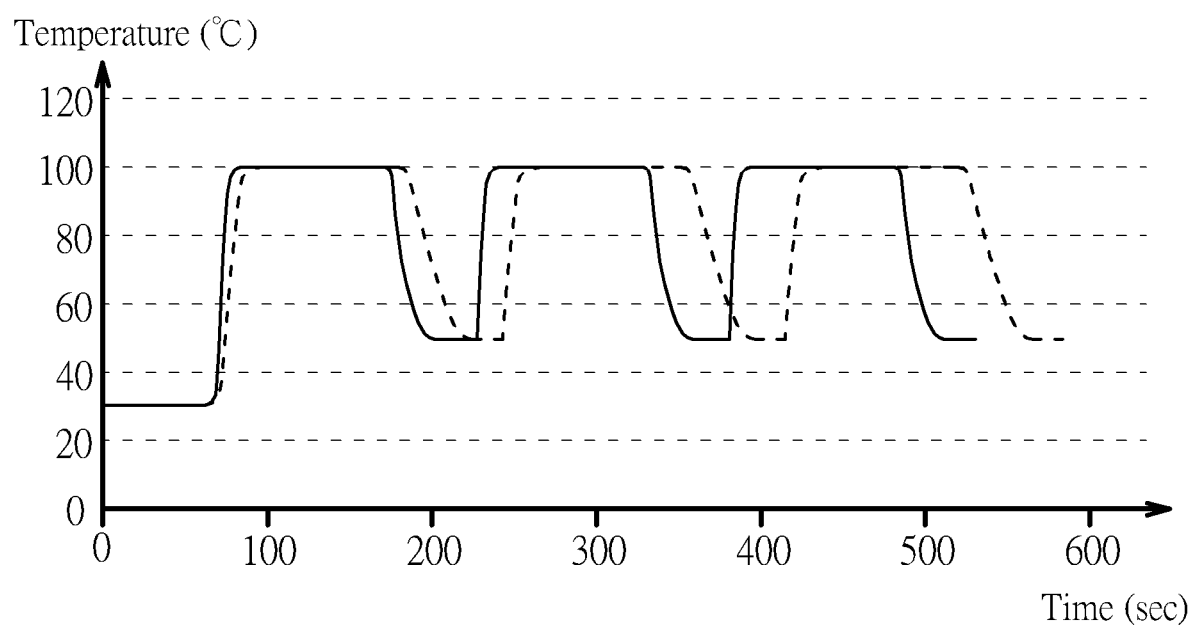
FIG. 5 is a schematic diagram illustrating thermal cycles for a thermal cycling device of the detection device.

As discussed above, by the heating and cooling mechanism described in the foregoing, the detection device 1 (or the thermal cycling device 1a) can provide a platform for thermal cycles through the thermally-conductive carrier 12. In the embodiment, the detection device 1 is used for, for example but not limited to, genetic detection. The thermally-conductive carrier 12 can carry multiple reaction containers 2 (e.g. reaction tubes) and provide thermal cycle environment for the reaction containers 2. The controller 26 controls the reaction detector 27 to detect reactive substance inside the reaction container 2. In an instance according to the invention, the reaction detector 27 may be an optical sensor used for optically sensing the reactive substance in the reaction container 2. The rotating device 24 rotates the thermally-conductive carrier 12, which facilitates the detection of the single one reaction detector 27 to the multiple reaction containers 2. Please refer FIG. 5, which is a schematic diagram illustrating thermal cycles. Therein, one thermal cycle curve of detection device 1 (or the thermal cycling device 1a) is shown in solid lines. The other thermal cycle curve of the detection device (or the thermal cycling device 1a) that has no selective liquid cooling function (e.g. without the first storage tank 16, the second storage tank 18, the delivery piping 20, and the liquid delivery device 22) is shown in dashed lines. As shown by FIG. 5, the thermal cycle curve of the detection device 1 (or the thermal cycling device 1a) shows a faster heating and cooling rate, and thereby shows a smaller cycle period, which helps to speed up the detection. In an instance according to the invention, the thermal cycling device 1a can perform one or more thermal cycles, of which each can include one temperature increase and one temperature decrease, or one temperature decrease and one temperature increase.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. A thermal cycling device, comprising:
   a thermally-conductive carrier;
   a temperature adjustment device, the temperature adjustment device comprising an electric heater and being thermally coupled with the thermally-conductive carrier;
   a first storage tank, the temperature adjustment device being at least partially disposed in the first storage tank;
   a liquid delivery device, the liquid delivery device comprising a pump and communicating with the first storage tank; and
   a controller, the controller being electrically connected to the temperature adjustment device and the liquid delivery device, the controller controlling operation of the electric heater and the pump.
2. The thermal cycling device according to claim 1, wherein the temperature adjustment device has a heat exchange surface, and the heat exchange surface is at least partially disposed in the first storage tank.
3. The thermal cycling device according to claim 1, further comprising a second storage tank and a delivery piping, wherein the second storage tank communicates with the liquid delivery device, and the delivery piping communicates with the first storage tank and the second storage tank.
4. The thermal cycling device according to claim 3, wherein a capacity of the second storage tank is greater than a capacity of the first storage tank.
5. The thermal cycling device according to claim 3, wherein the pump communicates with the first storage tank and the second storage tank.
6. The thermal cycling device according to claim 5, further comprising a liquid, stored in the first storage tank or the second storage tank, wherein the delivery piping comprises a first sub-piping and a second sub-piping, each communicating with the first storage tank and the second storage tank respectively, the pump is disposed in the first sub-piping, and the liquid delivery device uses the pump to deliver the liquid, selectively from the second storage tank to the first storage tank through the first sub-piping, or from the first storage tank to the second storage tank through the first sub-piping.

7. The thermal cycling device according to claim 5, wherein the delivery piping comprises a first sub-piping and a second sub-piping, each communicating with the first storage tank and the second storage tank respectively, the pump is disposed in the first sub-piping, the first storage tank has a first communicating hole and a second communicating hole, the second communicating hole is located higher than the first communicating hole, and the first sub-piping and the second sub-piping communicate with the first storage tank through the first communicating hole and the second communicating hole respectively.

8. The thermal cycling device according to claim 7, wherein a capacity of the second storage tank is greater than a capacity of a portion of the first storage tank that is below a position of the second communicating hole.

9. The thermal cycling device according to claim 7, wherein the temperature adjustment device has a heat exchange surface, the heat exchange surface is at least partially disposed in the first storage tank, the second communicating hole is located higher than the heat exchange surface.

10. The thermal cycling device according to claim 3, further comprising a heat-dissipating device, the heat-dissipating device comprises one of a heat sink, a fan, a thermoelectric component, and a heat pipe and is thermally coupled with the second storage tank to dissipate heat from the second storage tank.

11. The thermal cycling device according to claim 10, further comprising a temperature sensor, configured to sense a temperature of the second storage tank or a temperature of a liquid in the second storage tank, wherein the heat-dissipating device comprises the fan or the thermoelectric component and is electrically connected to the controller, the heat-dissipating device operates in response to the temperature-level.

12. The thermal cycling device according to claim 1, wherein the temperature adjustment device comprises a thermoelectric component.

13. A detection device, comprising the thermal cycling device according to claim 1 and further comprising an optical sensor, disposed adjacent to the thermally-conductive carrier.

14. The detection device according to claim 13, further comprising a rotating device, the rotating device comprising a motor and being electrically connected to the controller, the rotating device being configured to rotate the thermally-conductive carrier through the motor.

* * * * *